June 24, 1958  F. G. STEELE  2,840,306
DI-FUNCTION MULTIPLEXERS AND MULTIPLIERS
Filed Nov. 22, 1952  4 Sheets-Sheet 1

INVENTOR.
FLOYD G. STEELE
BY
*Walter J. Jason*
ATTORNEY

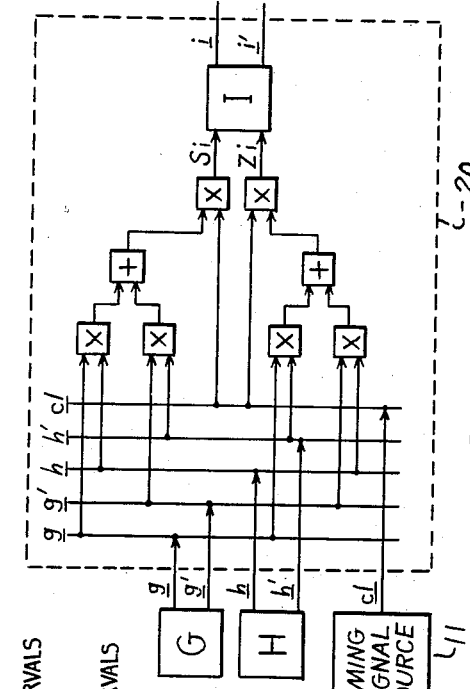
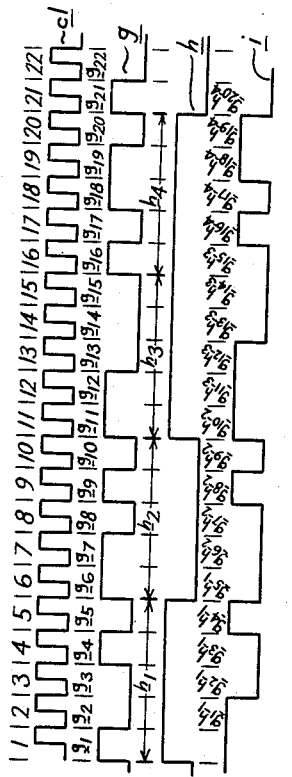
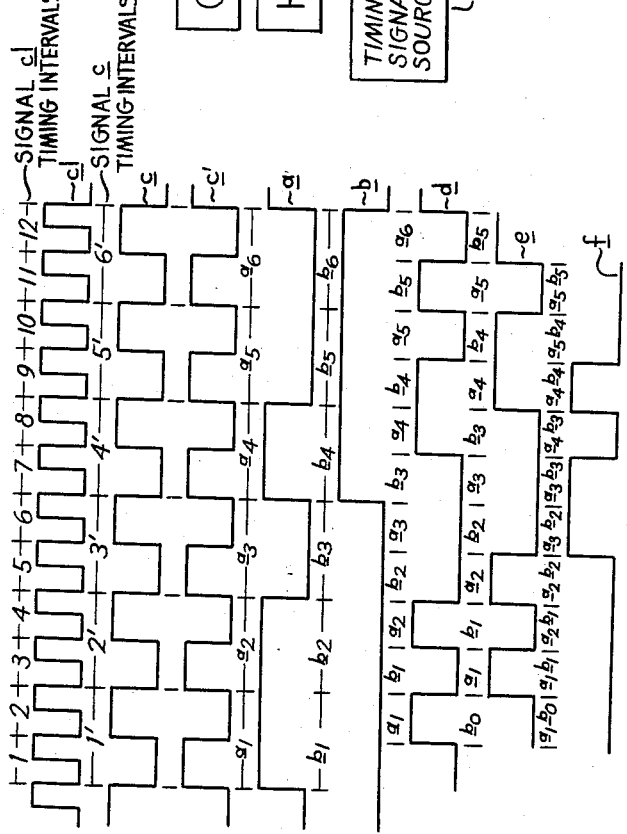

June 24, 1958  F. G. STEELE  2,840,306
DI-FUNCTION MULTIPLEXERS AND MULTIPLIERS
Filed Nov. 22, 1952  4 Sheets-Sheet 4

INVENTOR.
FLOYD G. STEELE
BY

United States Patent Office 2,840,306
Patented June 24, 1958

2,840,306

DI-FUNCTION MULTIPLEXERS AND MULTIPLIERS

Floyd G. Steele, La Jolla, Calif., assignor to Digital Control Systems, Inc., a corporation of California Application November 22, 1952, Serial No. 322,094

16 Claims. (Cl. 235—61)

This invention relates to di-function multiplexers and multipliers and, more particularly, to devices for multiplexing a plurality of di-function signals and for multiplying a pair of di-function signals.

Properties of information expressed in di-function signal form are described at length in the co-pending U. S. application for patent, Serial No. 311,609, filed September 26, 1952, for "Computer and Indicator System," to Floyd G. Steele. Briefly, di-function signal information is in the form of alternate high and low voltage levels, each of the levels appearing for an integral number of timing intervals. A high or low voltage level appearing for one interval is defined as an instantaneous +1 or −1 di-function value, respectively, and the information contained in such a signal is determined by the relative frequency of occurrence of one value relative to the other. For example, shaft rotation may be converted into a di-function signal, and for no overall shaft displacement, the di-function signal corresponding thereto would comprise alternate +1 and −1 values appearing during successive timing intervals. This value sequence indicates complete lack of shaft rotation by the equal frequency of value occurrence. Then, upon shaft rotation in one direction, an excess or greater number of +1 values compared to −1 values would be generated during the period of such shaft rotation. Conversely, if such shaft rotation should occur in the opposite direction, then an excess of −1 values would be generated in the di-function signal corresponding thereto.

The excess of +1 or −1 values over the other, as the case may be, generated during a period of time may be utilized in determining the actual shaft displacement or the average velocity of shaft rotation during such period of time. Although di-function information is, like shaft rotation, essentially non-numerical in form, this latter use converts such information into a numerical representation as understood and used in the mathematical interpretation of physical phenomena.

Another numerical interpretation of di-function information has resulted in defining the value, as distinguished from an instantaneous value, of a di-function signal as being equal to, for a time period having a given number of timing intervals, the number of +1 instantaneous values minus the number of −1 instantaneous values occurring during the period of time divided by the number of timing intervals in the period. Thus, from the previous example of a non-rotating shaft, the di-function signal representing such zero shaft displacement would have a zero value.

In the patent application referred to, shaft rotation was converted into a corresponding di-function signal and, in addition, the arithmetic operation of di-function serial half-addition or averaging was performed between two of such signals. Also, an operation of di-function deconversion was illustrated in which di-function information was changed into pulse form suitable for counting. The multiplexers and multipliers of the present invention illustrate other fundamental operations of an arithmetic nature capable of being performed between di-function signals.

In particular, one multiplexing embodiment of the present invention multiplexes or interlaces a pair of input di-function signals into a single output di-function signal. This is accomplished by alternately generating in the output signal, the consecutive di-function values of the two input signals such that each value of each input signal appears for half of its duration in the multiplexed signal. Such multiplexing operations result in the multiplexed signal having one-half the timing scale of the two input signals with its di-function value being equal to, as defined, the di-function full sum of the input signals. Hence, di-function multiplexing is equivalent to di-function full-addition and the result of such an arithmetic process may be contrasted with di-function half-addition or averaging as performed by the half-adder of the previously referred to application.

Half-addition or averaging of two input di-function signals results in a third di-function signal having the same timing scale as the input signals and containing +1 and −1 instantaneous values when the two input signals are concurrently at +1 and −1 values, respectively. During the timing intervals such input signals differ in value, their average may be a +1 value for the first interval of difference and then will alternate between −1 and +1 values during all remaining timing intervals of value difference. In this way, an effective di-function value of zero is obtained when considered for any two successive intervals of input signal difference, which effective zero value is equal to the average of simultaneously appearing +1 and −1 values. As the result of this type of operation, the output half-adder signal is in error for substantially half of the time owing to the averaging required to obtain an effective zero value.

The full-addition process inherently performed in multiplexing removes the error noted above in half-addition since the multiplexed result of +1 and −1 simultaneously appearing values in the input signals are positioned adjacent each other with respect to time in the multiplexed signal, each value thereof being foreshortened in time by a factor of one-half.

In addition to the two signal multiplexer embodiment, another version thereof is illustrated which is capable of interlacing four input signals so as to obtain the di-function full-addition thereof. The method of deriving this latter multiplexer is set forth to enable the ready design of one capable of interlacing $2^n$ input signals, the four signals multiplexed by the second embodiment being a special case where $n=2$.

A pair of di-function multiplier embodiments are described and illustrated, one of which multiplies each two adjacent di-function values in a multiplexed signal to produce, as defined, a chain product of the original di-function signals forming the multiplexed one. This is accomplished by delaying the multiplexed signal one timing interval and then deriving the direct instantaneous di-function product of each simultaneously appearing pair of values in the multiplexed and delayed multiplexed signals.

In the other multiplier embodiment, two parallel di-function input signals are multiplied, a requirement on the input signals being that the timing scale of one be a multiple of the timing scale of the other. This is necessary to remove inaccuracies, as described in detail later, which would normally result in the parallel multiplication of two di-function signals having the same time basis. The product is obtained between the signals such that each instantaneous value of the shorter scaled signal is multiplied with the concurrently appearing value of the other signal, the resulting product signal thereby having the shorter time basis.

It is, therefore, the principal object of the present invention to provide devices for multiplexing and multiplying di-function signals.

Another object of the present invention is to provide a device for multiplexing a pair of di-function signals and multiplying each pair of adjacent di-function values in the multiplexed signal.

Still another object of the present invention is to provide a device for multiplexing a pair of di-function signals, delaying the multiplexed signal one timing interval, and multiplying simultaneously appearing multiplexed and delayed multiplexed signal values together.

Another object of the present invention is to provide a device for multiplexing a pair of input di-function signals to form a third di-function signal having one-half the timing basis of the input signals.

Still another object of the present invention is to provide a device for alternately generating in an output di-function signal each consecutive di-function value of a pair of input di-function signals.

A further object of the present invention is to provide a device for multiplexing $2^n$ di-function signals to obtain an output di-function signal having $1/2^n$ the time basis of the input signals.

A still further object of the present invention is to provide a device for sequentially generating in an output di-function signal each of the simultaneously appearing di-function values of $2^n$ input signals whereby the multiplexed output signal represents a di-function full-addition of the input signals.

Another object of the present invention is to provide a device for multiplying each pair of adjacent di-function values in a multiplexed di-function signal.

Still another object of the present invention is to provide a device for delaying a multiplexed input signal one timing interval and consecutively multiplying each pair of simultaneously appearing values in the multiplexed and delayed multiplexed signals to form a di-function cross-product of the two di-function signals originally multiplexed to form the multiplexed signal.

A further object of the present invention is to provide a device for consecutively multiplying simultaneously appearing values in a pair of di-function signals.

A still further object of the present invention is to provide a device for multiplying a pair of input di-function signals having different time bases.

A further object of the present invention is to provide a device for multiplying each di-function value of one di-function signal having one time basis with all di-function values, appearing during its occurrence, of another di-function signal having a shorter time basis.

Other objects and features of the present invention will be readily apparent to those skilled in the art from the following specification and appended drawings wherein is illustrated a preferred form of the invention, and in which:

Fig. 4 is a composite group of signal waveforms illustrating the principles of operation of the system according to Fig. 1;

Fig. 5 is a circuit diagram of another form of di-function multiplier according to the present invention;

Fig. 6 is a composite group of signal waveforms illustrating the operation of the multiplier according to Fig. 5;

Figure 1:
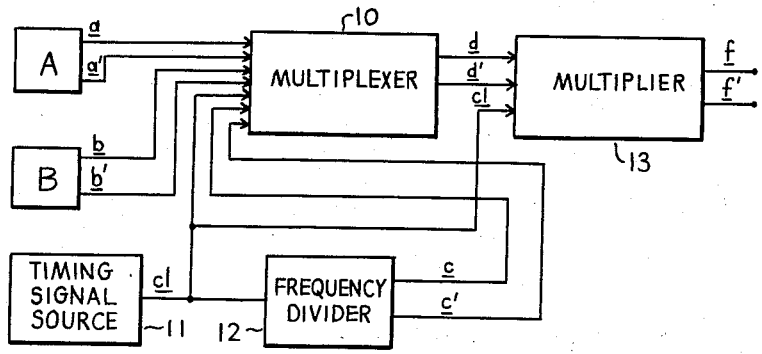
Fig. 1 is a block schematic diagram of a di-function multiplexer and multiplier system according to the present invention.

Referring now to the drawings, wherein like elements are given the same numerical designation, there is illustrated in Figure 1, one form of a di-function multiplexer and a di-function multiplier according to the present invention. The multiplexer 10 receives a first pair of complementary input di-function signals $a$ and $a'$, respectively, produced on the two output conductors of an electronic switching device, such as flip-flop A, and a second pair of complementary input di-function signals $b$ and $b'$, produced on the two output conductors of another electronic switching device, such as flip-flop B. Flip-flops A and B may be, by way of example, the principal flip-flops of a pair of di-function quantizers of the type illustrated and described in the before referred to application for patent.

Briefly each of these quantizers serves to convert the rotation of a shaft into a corresponding di-function signal. This is done by sensing the motion of the shaft by having an energized segment thereon make sequential contact with three brushes whose signals feed a diode gating network serving, in turn, to trigger three flip-flops, one being termed the principal one. This principal flip-flop is normally triggered by the gating network and the other flip-flop conduction states to produce a zero valued output signal, but responds to each predetermined amount of shaft rotation in one defined direction, as sensed by the brushes, to produce an extra $+1$ output value and responds to the same amount of shaft rotation in the other direction to produce a single extra $-1$ value. Such a quantizer is clocked, and as will be apparent later, signal $cl$ from source 11 will be of the proper phase and frequency to provide this timing function.

A timing signal source 11 produces a first square wave output timing signal $cl$ comprising a series of alternate high and low voltage levels, signal $cl$ being applied as an input signal to both multiplexer 10 and frequency divider 12. Signal source 11 may be a conventional multi-vibrator circuit, a blocking oscillator circuit, etc. and the duration of each adjacent low and high voltage level of signal $cl$ marks, as is hereafter referred to, a signal $cl$ timing interval. Divider 12 produces a pair of complementary output timing signals, $c$ and $c'$ which, in turn, are applied to two input terminals of multiplexer 10. The duration of each adjacent low and high voltage level of signal $c$ marks or indicates, as is afterwards referred to, a signal $c$ timing interval. Frequency divider 12 and multiplexer 10 are illustrated and described in detail in connection with Figure 2 of the present disclosure.

The pair of complementary output multiplexed signals $d$ and $d'$ produced by multiplexer 10 are applied to two of the input terminals of a di-function multiplier 13, signal $cl$ being applied to a final input terminal thereof. Multiplier 13, to be illustrated and described in detail in connection with Figure 3 of the present disclosure, produces a pair of complementary output di-function signals $f$ and $f'$ on its two output conductors, respectively.

Frequency divider 12 converts signal $cl$ into a similar signal $c$ having one-half the frequency thereof, signal $c$ providing the time basis of di-function signals $a$, $a'$, $b$ and $b'$, each instantaneous value thereof appearing for one signal $c$ timing interval. Thus, two consecutive signal $cl$ timing intervals are produced during appearance of each instantaneous di-function value of the above signals.

Multiplexer 10 acts to multiplex or interlace signals $a$ and $b$ such that its output signal $d$ comprises a di-function signal having each of the instantaneous di-function values of $a$ and $b$ but reduced one-half in time scale. This is accomplished by triggering flip-flop D at the end of the first half of any given signal $c$ timing interval to produce in signal $d$, the di-function value of signal $a$ during the given interval and then triggering flip-flop D at the end of the given interval to produce in signal $d$ during the first half of the next timing interval the di-function value of signal $b$ for the given timing interval. Stated differently, if each signal $c$ interval is considered as occurring during first and second consecutive signal $cl$ intervals, then the value of signal $a$ is generated in signal $d$ during the second signal $cl$ interval, the value of signal $b$ being generated in signal $d$ during the first $cl$ timing interval of the next signal $c$ interval. The timing scale of signal $d$ is consequently determined by signal $cl$ and each di-function value thereof lags by one $cl$ interval the appearance of its corresponding value in signal $a$ or $b$.

Multiplier 13 multiplies each di-functional value of signal $d$ and the succeeding value and the result of such multiplications, measured by timing signal $cl$, appears as consecutive instantaneous di-function values in the multiplier's output signal $f$. The result of such a multiplication is here defined as a chain or cross-product.

Figure 2:
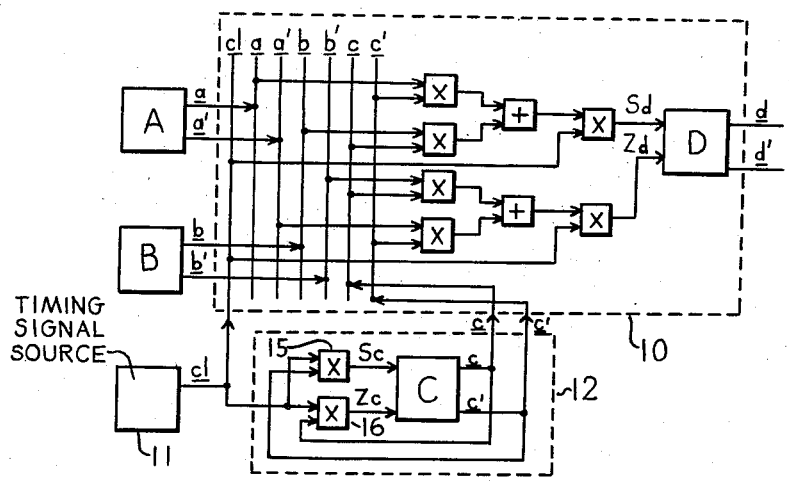
Fig. 2 is a detailed circuit diagram of the di-function multiplexer according to Fig. 1.

Referring now to Figure 2, there is illustrated in detail multiplexer 10 and frequency divider 12.

For the purpose of clarity, each bi-stable flip-flop is schematically illustrated by a box having its alphabetical designation placed therein in capitalized form. In addition, the two output conductors are each designated by the flip-flop's letter, lower case, with one being primed to indicate the complementary signal. The two input conductors are designated by S, signifying "set," and Z, signifying "zero," each being followed by the lower case alphabetical connotation given its flip-flop. Electronically, the input and output designations mean that a triggering signal applied to the S or "set" conductor triggers the flip-flop such that the signal appearing on the unprimed output signal conductor goes to the high voltage level, taken here to represent the binary one value, with, as a necessary consequence, the signal appearing on the primed signal conductor taking the reverse or low voltage level. On the other hand, a triggering signal applied to the Z or "zero" conductor causes the reverse conduction state from that described above to be produced with the unprimed output signal going low, representing the binary value of zero, and the primed signal taking the high level.

Considering the representation employed for the gating network, those boxes having the cross-mark, "X," therein are logical "and" gating circuits and may, quite obviously, take various forms as understood in the art. One preferred type is the crystal diode type wherein each input signal is applied to the cathode of an associated crystal diode, preferably of the germanium variety, the anodes of the diodes therein being jointly coupled through a high valued resistor to a source of high positive potential. The junction formed between the diode anodes and resistor end then forms the output terminal of the circuit and will be at the high voltage level only upon all input signals to the circuit being simultaneously high and will be at the low level upon any combination or all of the input signals being likewise at the low level.

The logical "or" gating circuits are represented by blocks having a plus mark, "+," therein and are preferably similar to the "and" gates described above except that the diode directions are reversed and the resistor therein is connected to a source of high negative potential. In such circuits, the junction between the diode cathodes and resistor will be at the high voltage level whenever any or all of the input signals are high and will be low upon all of such input signals being simultaneously at their low voltage levels.

As will be understood, innumerable variations exist in bi-stable flip-flop designs suitable for use with the above described preferred types of logical gating circuits. Accordingly, the choice of a proper flip-flop capable of being triggered by such gating circuits may be readily made by one skilled in the art.

In any event, the flip-flop and gating circuit symbols found herein and in the remaining figures are identical to those used in the before referred to application for patent and the structure signified thereby may be likewise identical.

In Figure 2, signal $cl$ is applied within divider 12 to one input terminal of each of a pair of two terminal "and" gating circuits 15 and 16, the output terminals of which are connected to the $S_c$ and $Z_c$ input conductors, respectively, of an electronic switch, such as flip-flop C. The output signal $c$ of flip-flop C is applied to the other input terminal of gating circuit 16, while the complementary output signal $c'$ of flip-flop C is applied to the other input terminal of gating circuit 15.

In operation, if signal $c$ is at its high voltage level, then circuit 16 will have a high voltage level applied to its input terminal corresponding thereto and timing signal $cl$, upon rising to its high voltage level during the last half of its timing interval, will prepare flip-flop C for firing through its $Z_c$ conductor. Then, upon signal $cl$ switching to its low voltage level at the end of the timing interval, flip-flop C will accordingly be triggered with signals $c$ and $c'$ switching to the low and high levels, respectively. Then, at the end of the next signal $cl$ timing interval, flip-flop C will be triggered similarly through its $S_c$ input conductor, owing to the action of gating circuit 15, with signals $c$ and $c'$ returning to their high and low voltage levels, respectively. In considering signal $c$, it is seen that it assumes consecutive low and high voltage levels during two successive signal $cl$ timing intervals and hence constitutes the desired frequency division thereof.

In considering the derivation of multiplexer 10, reference is made to Programming Table 1 included next:

*Programming Table 1*

| Lines | $a$ | $b$ | $c$ | $d$ | $S_d$ | $Z_d$ |
|---|---|---|---|---|---|---|
| 1 | 1 | 1 | −1 | 1 | 1 | |
| 2 | 1 | 1 | 1 | 1 | 1 | |
| 3 | 1 | −1 | −1 | 1 | 1 | |
| 4 | 1 | −1 | 1 | −1 | | 1 |
| 5 | −1 | 1 | −1 | −1 | | 1 |
| 6 | −1 | 1 | 1 | 1 | 1 | |
| 7 | −1 | −1 | −1 | −1 | | 1 |
| 8 | −1 | −1 | 1 | −1 | | 1 |
| Col | 1 | 2 | 3 | 4 | 5 | 6 |

All possible combinations of signal $a$, $b$ and $c$ di-function values are found in columns 1, 2 and 3 and on lines 1 through 8 of Table 1. Square wave timing signal $c$ may be included by considering its alternate high and low voltage levels as constituting a zero valued di-function signal having consecutive +1 and −1 instantaneous values, respectively, each of which appears for one signal $cl$ timing interval. Thus, on lines 1 and 2 of Table 1, for example, with signals $a$ and $b$ both equal to +1, signal $c$ may have a +1 value as indicated on line 1 or a −1 value as indicated on line 2.

As stated previously, input signals are to be applied to flip-flop D at the end of each signal $cl$ timing interval so as to alternately produce in signal $d$, the respective values of signals $a$ and $b$. This is provided for in Programming Table 1, as may be readily seen from lines 3 and 4, where signals $a$ and $b$ have the values of +1 and −1, respectively. Thus, on line 3 where signal $c$ equals −1 for the first half of its signal $cl$ timing interval, signal $d$ in column 4 is to be set equal to +1, the value of signal $a$, at the end of this first half interval. On line 4, during the second half of the same timing interval where $c$ equals to +1, signal $d$ is to be set equal to −1, the value of signal $b$, at the end thereof. Signal $d$ is set equal to +1 for the programming defined on line 3 by applying a triggering signal to the $S_d$ input conductor of flip-flop D as indicated in column 5. In the same way, as indicated on line 4, column 6, signal $d$ is set equal to −1 by applying a triggering signal to the $Z_d$ input conductor of flip-flop D as indicated in column 6.

From the description of Table 1 thus far presented, the remaining portions thereof may be readily understood and from the table, the Boolean equations defining the triggering operations defined therein for flip-flop D may be written as understood by those skilled in the art. The first equation for the gating circuitry coupled to the $S_d$ input conductor is, bearing in mind timing signal $cl$:

$$S_d = (a \cdot b \cdot c' + a \cdot b \cdot c + a \cdot b' \cdot c' + a' \cdot b \cdot c) \cdot cl \quad \text{(Eq. 1)}$$

Equation 1 may be reduced, by use of appropriate logical tautologies, to:

$$S_d = (a \cdot c' + b \cdot c) \cdot cl \quad \text{(Eq. 2)}$$

In the same manner, the unreduced equation for the $Z_d$ input conductor gating circuitry may be written from Table 1 as:

$$Z_d = (a \cdot b' \cdot c + a' \cdot b \cdot c' + a' \cdot b' \cdot c + a' \cdot b' \cdot c') \cdot cl \quad \text{(Eq. 3)}$$

Equation 3 may be reduced to:

$$Z_d = (b' \cdot c + a' \cdot c') \cdot cl \quad \text{(Eq. 4)}$$

From Equations 2 and 4 may be drawn the gating circuitry connected to the $S_d$ and $Z_d$ conductors, respectively, as specifically illustrated in Figure 2. A detailed description of the manner of mechanizing Boolean equations into circuitry although known to those skilled in the art may be found in the before referred to application for patent. As will be appreciated, the individual "and" and "or" gating circuits, here indicated as blocks, may be similar to the detailed circuitry corresponding thereto as set forth in Figure 3 of the referred to patent application. As is well known, manipulations of Boolean equations, such as Equations 2 and 4, by logical mathematical rules, yield other equations and hence other gating networks capable of producing the same results as the specified circuitry herein illustrated. Obviously, no invention would be involved in such manipulations of these equations nor in other specific equations to be derived later in connection with other forms of the present invention.

The process of multiplexing two di-function signals, results in the multiplexed signal being equivalent to, as defined, the di-function full sum of the two input signals. In other words, multiplexing a pair of signals produces the di-function full-addition thereof as measured by the di-function values of the multiplexed signal at its reduced time scale. Di-function full-addition then, is an arithmetic process in which each pair of simultaneously appearing di-function values of the two input signals appear consecutively with respect to time in the output multiplexed signal.

The process of di-function averaging or half-addition, on the other hand, as explained in the referred to application, produces a signal having the same time scale as the two input signals, but whenever the actual instantaneous sum of zero is required, as when the two input signals differ in value, a $+1$ output value, for example, may be produced, which value is remembered during the next interval state of a memory flip-flop, so that during the next interval the input signals differ in value, a $-1$ value is produced. This $-1$ value averages with the before mentioned $+1$ value to form the required zero value. Thus, the values of $+1$ and $-1$ are consecutively produced during consecutive timing intervals that such input signal values differ. The result of half-addition is consequently in error in the above example from the time the stated $+1$ value was produced until the $-1$ value appeared. This deficiency of di-function half-addition is eliminated in the full-addition herein exemplified since the zero result is realized by consecutively appearing $+1$ and $-1$ values in the multiplexed signal.

If a first di-function signal were multiplexed with the complement of a second di-function signal, the value of the resulting multiplexed signal would be equivalent to the full-subtraction of the second from the first of such signals. This follows directly from the fact that the di-function value of the first signal would be added to the inverted or negative value of the second signal, the result thereof being subtraction.

Figure 3:
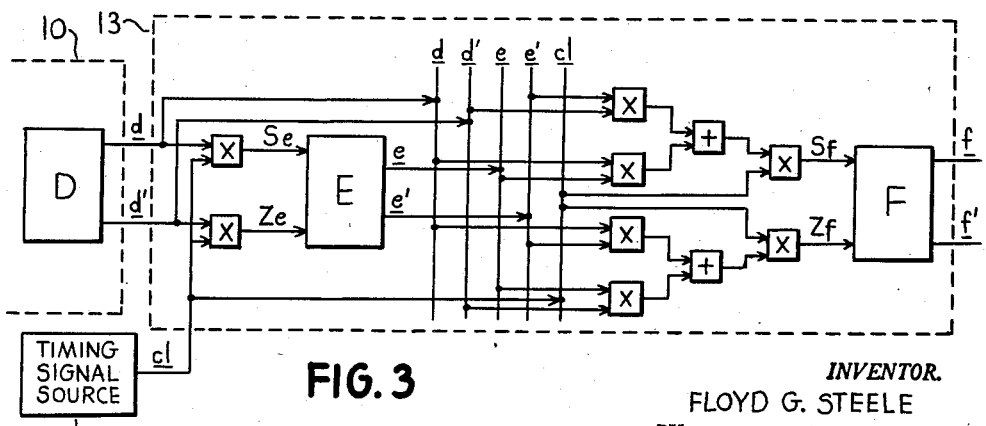
Fig. 3 is a detailed circuit diagram of the di-function multiplier according to Fig. 1.

Referring now to Figure 3, there is illustrated a detailed circuit diagram of di-function multiplier 13 according to the present invention. As stated previously, multiplier 13 multiplies each instantaneous di-function value and the succeeding value of signal $d$ and produces an output instantaneous di-function value corresponding to the result thereof in its output signal $f$.

This is accomplished by delaying through a flip-flop E each di-function value of signal $d$ one signal $cl$ timing interval, and then comparing all concurrently appearing values of signal $d$ and signal $e$, the output signal of flip-flop E, and producing the instantaneous di-function products thereof. By definition, the di-function product of a pair of $+1$ or $-1$ values is equal to $+1$, the product of a pair of different values being equal to $-1$. Thus, if two adjacent di-function values are different in value, their product is $-1$, while if similar in value, their product is $+1$.

Flip-flop E is triggered to provide the required time delay of signal $d$ by applying signals $d$ and $d'$ to one input terminal of each of two two-terminal "and" gating circuits, the output terminals of which are connected to the $S_e$ and $Z_e$ input conductors, respectively, of flip-flop E. Timing signal $cl$ is then applied to the other input terminal of each gating circuit with the result that at the conclusion of each timing interval signal $d$ is high, flip-flop E is actuated through its $S_e$ input conductor to produce a high voltage level in signal $e$ and is further actuated through its $Z_e$ input conductor at the conclusion of each timing interval. Signal $d'$ is high to produce a low voltage level in signal $e$. Accordingly, each signal $d$ value is transferred to signal $e$ at the conclusion of its respective timing interval.

The derivation of the remaining circuitry of Figure 3 may be most readily understood from Programming Table 2 included next:

*Programming Table 2*

| Lines | d | e | f | $S_f$ | $Z_f$ |
|---|---|---|---|---|---|
| 1 | 1 | 1 | 1 | 1 |  |
| 2 | 1 | -1 | -1 |  | 1 |
| 3 | -1 | 1 | -1 |  | 1 |
| 4 | -1 | -1 | 1 | 1 |  |
| Col | 1 | 2 | 3 | 4 | 5 |

In columns 1 and 2 of Table 2 are found the four possible di-function value combinations of signals $d$ and $e$ while, in column 3, is found the resultant di-function product thereof to be generated in signal $f$. Thus, on lines 1 and 4 where signals $d$ and $e$ have identical values, signal $f$ is to be set equal to $+1$, while on lines 2 and 3 where signals $d$ and $e$ differ in value, signal $f$ is to be set equal to $-1$. In columns 4 and 5 are found the required triggering signals to be applied to the $S_f$ and $Z_f$ input conductors for programming the signal $f$ values indicated in column 3. As will be apparent, each signal $f$ value will be the product of the signal $d$ and $e$ values appearing during the preceding timing interval since each flip-flop F triggering operation is performed at the end of a timing interval.

From columns 4 and 5, and including remembering timing signal $cl$, the Boolean equations defining the gating circuitry to be connected to the $S_f$ and $Z_f$ input conductors may be written as:

$$S_f = (d \cdot e + d' \cdot e') \cdot cl \quad \text{(Eq. 5)}$$
$$Z_f = (d \cdot e' + d' \cdot e) \cdot cl \quad \text{(Eq. 6)}$$

The multiplier circuit of Figure 3 is a mechanization of Equations 5 and 6, including the triggering circuitry previously described for delay flip-flop E.

The operation of multiplier 13 and multiplexer 10 of Figure 1 may be best understood by reference to the composite group of signal waveforms illustrated in Figure 4. First illustrated is timing signal $cl$ appearing during a series of designated signal $cl$ timing intervals. Timing signal $c$ is also illustrated, signal $c$ appearing during a series of designated signal $c$ timing intervals. Signal $c'$, complementary to signal $c$, is also illustrated in Figure 4, as are input di-function signals $a$ and $b$, given by way of example. The consecutive instantaneous values of signal $a$ during the 1st, 2nd, 3rd, etc., signal $c$ timing intervals are designated $a_1$, $a_2$, $a_3$, etc., while the corresponding values of signal $b$ during the same timing interval are designated $b_1$, $b_2$, $b_3$, etc.

During the 1st signal $c$ timing interval, signals $a$ and $b$ are at their high and low voltage levels, or $a_1$ and $b_1$ values, respectively, the result being that flip-flop D is triggered at the end of the 1st signal $cl$ timing interval to produce in signal $d$ the high or $a_1$ value of signal $a$ during the 2nd signal $cl$ timing interval, and is then triggered at the end of the second $cl$ timing interval to produce in signal $d$, during the 3rd $cl$ timing interval the low voltage or $b_1$ value of signal $b$.

During the 2nd signal $c$ timing interval, signals $a$ and $b$ are still at high and low, or $a_2$ and $b_2$ values, respectively, with signal $d$ being correspondingly at high and low voltage levels during the 4th and 5th $cl$ timing intervals, respectively. During the 3rd signal $c$ timing interval, signals $a$ and $b$ are simultaneously at their low voltage level, or $a_3$ and $b_3$ values, respectively, with signal $d$ being at the low voltage level during both the 6th and 7th signal $cl$ intervals. In like manner, signal $d$, during the remaining timing intervals, as illustrated, may be readily understood.

Signal $e$ of flip-flop E is next illustrated, signal $e$ being similar to signal $d$ but delayed by one signal $cl$ interval with respect thereto, signal $e$ having, during the 2nd designated $cl$ timing interval, the value $b_0$, or low level, not before illustrated, of signal $b$.

Signal $f$, next illustrated, is the, as defined, chain product of the di-function values of signals $d$ and $e$, signal $f$, in practice, being delayed one timing interval to the right as viewed from Fig. 4. Consequently, during the 2nd $cl$ timing interval, signals $d$ and $e$ being at their $a_1$ and $b_0$, or $+1$ and $-1$ di-function values, respectively, signal $f$ has a $-1$ value appearing during the 3rd $cl$ timing interval, which value, designated $a_1 b_0$, is the di-function product thereof. During the 3rd $cl$ timing interval, the $b_1$ and $a_1$ or $-1$ and $+1$ values of signals $d$ and $e$, respectively, result in the product $a_1 b_1$ of signal $f$ being equal to $-1$ as it appears during the 4th timing interval. In the same manner, the remaining product values of signal $f$ may be readily ascertained and understood.

The multiplication function performed by chain multiplier 13 may be mathematically expressed by considering signal $a$ as comprsing the series of di-function values in the equation $a_0 + a_1 + a_2 + \ldots + a_n$, and considering signal $b$ as comprising the series of di-function values in the equation $b_0 + b_1 + \ldots + b_n$, wherein identically numbered subscripts of the two equations occur simultaneously with time. In the above and following equations, each of the series of indicated di-function values will represent either an actual $+1$ or $-1$ value. The equation of multiplexed signal $d$ may be expressed by the equation $$a_0 + b_0 + a_1 + b_1 + a_2 + b_2 + \ldots + a_n + b_n$$

while chain product signal $f$ may be expressed by the equation $$a_1 b_0 + a_1 b_1 + a_2 b_1 + a_2 b_2 + a_3 b_2 + a_3 b_3 + a_4 b_3 + \ldots a_n b_n$$

As will be observed from the resulting equation, each instantaneous value of signal $a$ is multiplied both by the instantaneous value of signal $b$ occurring simultaneously in time therewith and the value of signal $b$ occurring during the preceding timing interval. Hence, every other value of signal $f$ is a cross-product of the two input signals.

Referring now to Figure 5, there is illustrated another di-function multiplier 20, producing, as defined, direct di-function multiplication, according to the present invention. Multiplier 20 differs from multiplier 13 in that it directly multiplies the simultaneously appearing di-function values of two paralleled input di-function signals instead of cross-multiplying the values of a multiplexed signal in the manner of multiplier 13. However, a definite relationship between the di-function signals multiplied by multiplier 20 is required, the relationship being that the timing base of one signal be a multiple of the other.

This relationship is required, since, if the input signals had the same time base and were substantially zero valued, then the output signal obtained from such direct multiplication might be either a substantially continuous $+1$ value or a substantially continuous $-1$ value, depending on the relative phasing between the alternate $+1$ and $-1$ values in the two input signals. For example, if one signal, at a given time interval, had a $+1$ value and then consecutive $-1$ and $+1$ values thereafter, while the other signal contained a $-1$ value at the given time interval, and consecutive $+1$ and $-1$ values thereafter, the direct product of the two signals would be a continuous series of $-1$ values. On the other hand, if each signal had a $-1$ value at the given time interval with consecutive $+1$ and $-1$ values thereafter, their product would comprise a series of consecutive $+1$ values. The products in both examples would be erroneous since the direct product of two substantially zero valued di-function signals should be substantially equal to zero.

However, by multiplying two di-function signals having different time bases wherein the duration of timing intervals marking one is a multiple of the duration of timing intervals marking the other, the above-noted error owing to phase differences is substantially reduced. In fact, the accuracy of the direct product will be dependent on the ratio between the two timing interval durations, the phase displacement error decreasing as the difference between timing interval durations becomes greater.

In Figure 5 are shown two electronic switches, such as flip-flops G and H, producing pairs of complementary output di-function signals $g$, $g'$ and $h$, $h'$, respectively, said signals being applied as input signals to direct multiplier 20. These flip-flops may again be the principal ones within a pair of quantizers, as before described in conjunction with flip-flops A and B of Figure 1, but clocked by different timing signal frequencies as hereinafter described. Since, as has been mathematically defined, identical di-function values yield an instantaneous product of $+1$ and different di-function values yield an instantaneous product of $-1$, the gating circuitry connected between the signal $g$, $g'$, $h$, $h'$ conductors and the $S_i$ and $Z_i$ input conductors of the product flip-flop I within multiplier 20 is identical to the gating circuitry connected between the signal $d$, $d'$, $e$ and $e'$ conductors and the $S_f$ and $Z_f$ input conductors of flip-flop F in Figure 3. This circuit similarity exists even though one di-function signal in this case has a longer time basis than the other signal since the longer time basis signal may be considered as always having more than one consecutive $+1$ or $-1$ instantaneous value as marked by the shorter time intervals. Another restriction on the multiplier 20 is that the input timing signal applied thereto should be the one marking or measuring the di-function input signal having the shorter time basis.

In Figure 6 is found a composite group of signal wave-forms illustrating the principles of operation of multiplier 20, wherein signal $g$, having the shorter time basis is illustrated, as is signal $cl$ marking the values thereof. The successive values of signal $g$ during the designated timing intervals of signal $cl$ are denoted by $g_1, g_2, g_3$, etc. Signal $h$ is illustrated, and for the purpose of this illustration, has a timing scale five times that of signal $g$. Hence, the successive values of signal $h$ are denoted by $h_1, h_2, h_3$, etc., each value appearing for five signal $cl$ timing intervals.

The product of signals $g$ and $h$ appear in the output signal $i$ produced by an output flip-flop I and each value thereof, marked by signal $cl$, is the product of the instantaneous difunction values of signals $g$ and $h$ but delayed one $cl$ timing interval with respect thereto. Thus, the consecutive values of signal $i$ appearing during the 2nd, 3rd, 4th, etc. timing intervals of signal $cl$ are designated by $g_1 h_1, g_2 h_1, g_3 h_1$, etc., respectively. As will be apparent from inspection of the wave-forms of Figure 6, different values of signals $g$ and $h$ result in a $-1$ signal $i$ value while identical values, whether $+1$ or $-1$, result in a $+1$ signal $i$ value. Although signal $h$ has been illustrated as having five times the timing scale of signal $g$, it is apparent that other ratios between the two would be equally operable. In some instances, the ratio may be on the order of 100 to 1, in which case, a high degree of accuracy in the product signal would be obtained.

Figure 7:
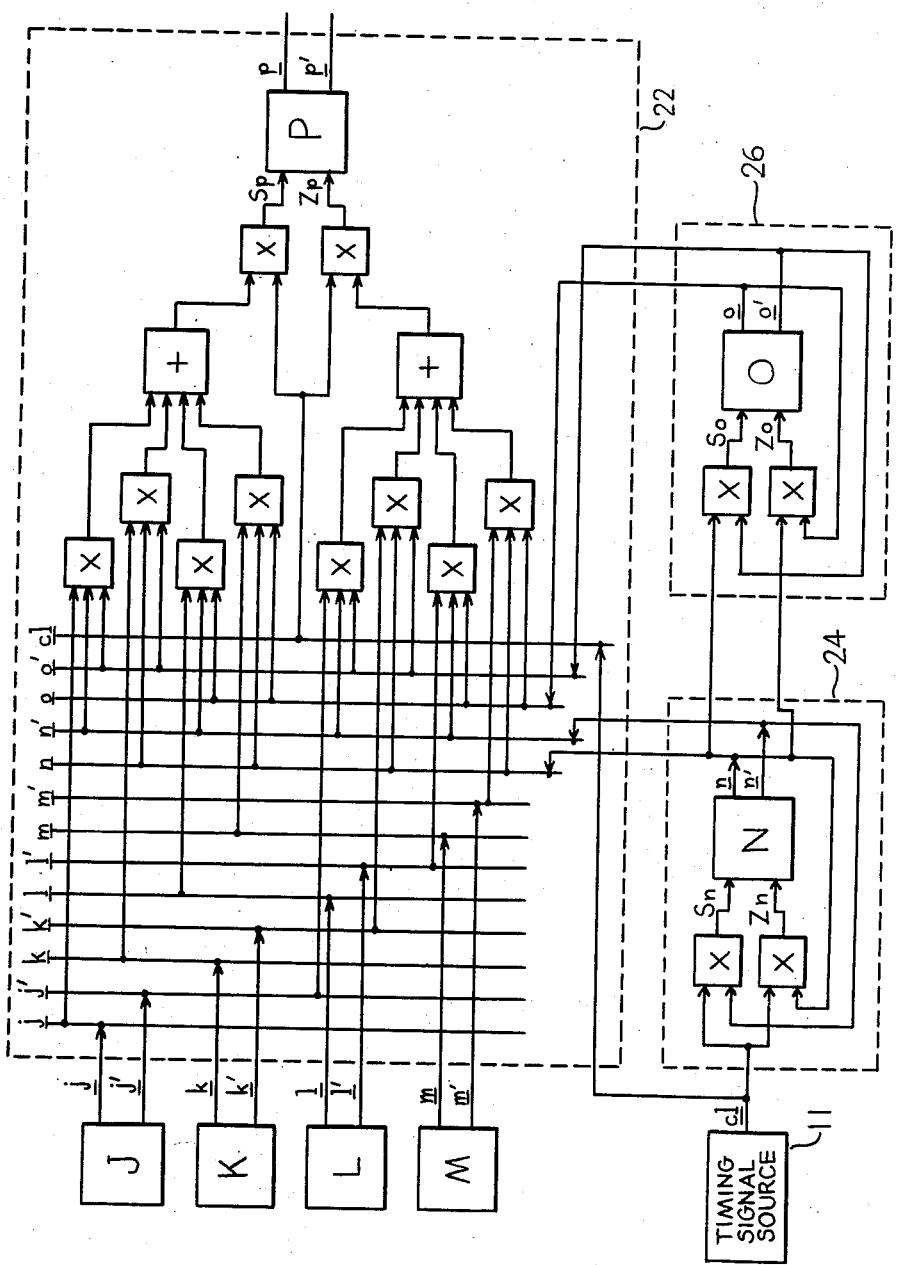
Fig. 7 is a circuit diagram of another form of di-function multiplexer according to the present invention.

Referring next to Figure 7, there is illustrated a four signal multiplexer 22 according to the present invention. Timing source 11 is again illustrated, its output signal $cl$ being divided by a first frequency divider 24 similar to divider 12 of Figure 2, into a pair of complementary output signals $n$ and $n'$ which, in turn, are divided by a second frequency divider 26 into a pair of complementary output signals $o$ and $o'$. Timing signals $cl, n, n', o$ and $o'$ are applied to multiplexer 22 as are the four pairs of complementary signals to be multiplexed, designated $j$ and $j'$, $k$ and $k'$, $l$ and $l'$, and $m$ and $m'$, produced by flip-flops J, K, L and M, respectively. These latter flip-flops may again comprise the principal flip-flops within four separate di-function quantizers, all clocked relative to signal $o$, as will be more specifically brought forth later.

The frequency dividing operation on signals $n$ and $n'$ of divider 24 performed by divider 26 is identical to that performed by divider 24 on signal $cl$, the result being that signal $o$ is one-fourth and one-half the frequency of signals $cl$ and $n$, respectively. As is also apparent, the two frequency dividers constitute a conventional scale-of-two counter, wherein complementary output counting signals are available at each stage. The timing intervals measured by each successive low and high voltage levels of signal $o$ serve to mark the instantaneous di-function values of signals $j, k, l$ and $m$, in the manner that signal $c$ marked signal $a$ and $b$ values in the multiplexer of Figure 2.

In operation, signal $cl$ indicates or marks four of its timing intervals each instance signal $o$ is marking one instantaneous value in the various input signals. At the end of the first signal $cl$ interval in each signal $o$ timing interval, the multiplexer output flip-flop P is triggered to produce during the second $cl$ interval, the corresponding value of signal $j$ in its output signal $p$. Flip-flop P is successively triggered at the end of the second, third, and fourth $cl$ intervals in each signal $o$ interval to produce in its signal $p$, the values of signals $k, l$ and $m$, respectively, signal $p$ thereby having one-fourth the timing scale of each input signal. The manner of accomplishing this function, including the derivation of the circuitry therefor, may be most readily understood by referring to the next included Programming Table 3.

Programming Table 3

| Line | Input Signals | | | | Timing Signals | | Output | |
|---|---|---|---|---|---|---|---|---|
| | $j$ | $k$ | $l$ | $m$ | $n$ | $o$ | $S_p$ | $Z_p$ |
| 1 | 1 | | | | $-1$ | $-1$ | 1 | |
| 2 | $-1$ | | | | $-1$ | $-1$ | | 1 |
| 3 | | 1 | | | 1 | $-1$ | 1 | |
| 4 | | $-1$ | | | 1 | $-1$ | | 1 |
| 5 | | | 1 | | $-1$ | 1 | 1 | |
| 6 | | | $-1$ | | $-1$ | 1 | | 1 |
| 7 | | | | 1 | 1 | 1 | 1 | |
| 8 | | | | $-1$ | 1 | 1 | | 1 |
| Col | 1 | 2 | 3 | 4 | 5 | 6 | 7 | 8 |

On lines 1 and 2, 3 and 4, 5 and 6, 7 and 8, of Table 3 are found the pairs of possible values of signals $j, k, l$ and $m$, respectively, while in columns 5 and 6 are found the four possible combinations of values of signals $n$ and $o$, each combination being positioned adjacent a corresponding pair of the input signal values. Since, during each signal $o$ timing interval, the values of the four input signals are to be consecutively produced in signal $p$, it is apparent that these four sets of value combinations of signals $n$ and $o$ are required to provide proper programming of flip-flop P. Thus, at the conclusion of the period that $n$ and $o$ are simultaneously equal to $-1$, as on lines 1 and 2, signal $p$ is to be set equal to signal $j$, while when $n$ and $o$ are equal to $+1$ and $-1$, respectively, as on lines 3 and 4, signal $p$ is to be set equal to signal $k$, etc. The flip-flop P triggering signals corresponding to the indicated programming are found in columns 7 and 8 and, using timing signal $cl$, the Boolean equations corresponding to the gating circuitry for performing such programming operations may be written from Table 3 as:

$$S_p = (j \cdot n' \cdot o' + k \cdot n \cdot o' + l \cdot n' \cdot o + m \cdot n \cdot o) \cdot cl \quad \text{(Eq. 7)}$$

$$Z_p = (j' \cdot n' \cdot o' + k' \cdot n \cdot o' + l' \cdot n' \cdot o + m' \cdot n \cdot o) \cdot cl \quad \text{(Eq. 8)}$$

Figure 8:
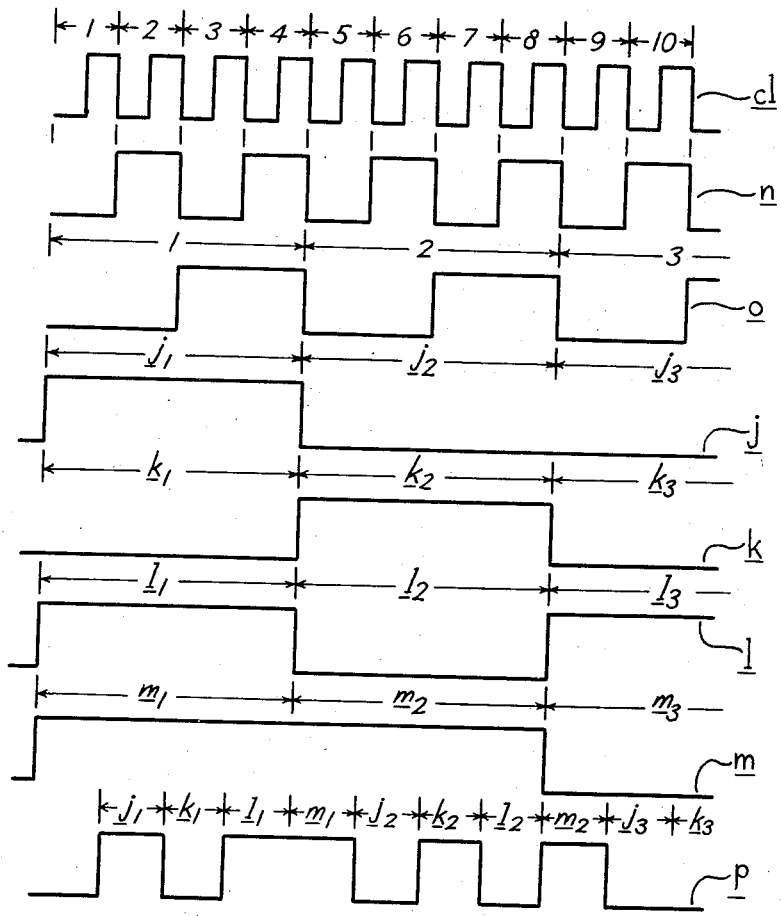
Fig. 8 is a composite group of signal waveforms illustrating the operation of the multiplexer according to Fig. 7.

The operation of multiplexer 22 may be best understood by referring to the waveforms illustrated in Figure 8. Here illustrated are timing signals $cl, n$ and $o$, as well as input signals $j, k, l$ and $m$, the waveforms of the latter group being by way of example only. During the 1st designated $cl$ timing interval, signals $n$ and $o$ are both equal to $-1$, the result being that output signal $p$ has, during the 2nd $cl$ interval, the value of signal $j$, that is, a $+1$ value as indicated by $j_1$. This one interval displacement arises, as formerly, from the necessity of performing each flip-flop triggering operation at the conclusion of a timing interval.

During the 2nd $cl$ interval, signals $n$ and $o$ are equal to $+1$ and $-1$, respectively, hence, a signal $p$ value of $-1$, designated $k_1$, is generated during the 3rd $cl$ interval, value $k_1$ being the value of signal $k$ during the first signal $o$ timing interval. During the 4th $cl$ timing interval, corresponding to the $-1$ and $+1$ values of signals $n$ and $o$, respectively, during the 3rd interval, a $+1$ value is generated in signal $p$ which $+1$ value corresponds to the $l_1$ or $+1$ value of signal $l$ during the 1st signal $o$ timing interval. During the 5th $cl$ timing interval, corresponding to the simultaneous $+1$ values of signals $n$ and $o$ during the 4th interval, a signal $p$ value of $+1$ is generated corresponding to the $+1$ or $m_1$ value of signal $m$ during the 4th interval. During the next four $cl$ timing intervals, the above described operation is repeated with signal $p$ again successively assuming the 2nd signal $o$ timing interval values of signals $j, k, l$ and $m$.

The value of multiplexed signal $p$ is the full-sum of input signals $j, k, l$ and $m$ as defined for signal $d$ in the multiplexer embodiment of Figure 2. Multiplexer 22 is intended to illustrate the principles involved in multiplexing and hence, producing the serial or full-addition of $2^n$ input signals, where $n$ is an integer greater than one. As will be observed, the multiplier illustrated in Figure 2 is a special case of multiplier 22 wherein $n$ equals one.

The principles herein outlined briefly include the provision of $n$ frequency dividers, or a $n$-stage counter, each divider or counter stage producing complementary output signals. Next a programming table similar to Table 3, may be drawn wherein is indicated all possible combinations of divider or counter output signals, each combination thereof being paired with a given complementary pair of the $n$ input signals. The resultant programming of the output flip-flop may next be set forth and from the table, Boolean equations written defining the mathematically described electrical operations. From mechanizing such equations, circuit embodiments may be obtained capable of producing the desired electrical results.

Although multiplexer 22 has been described as performing di-function full-addition, it is apparent that one or more of the input signals may be subtracted, by interchanging their respective pairs of input conductors, from the sum of the remaining ones. If this is done, then as pointed out in connection with multiplexer 10, the inverse or complementary values of the signals to be subtracted are added to the remaining signals, the result being that the value of the di-function output signal will be equal to the sum of the signals to be added minus the sum of the signals to be subtracted.

As will be apparent to those skilled in the art, other types of switching devices such as relays, etc., may be substituted for the flip-flop circuits utilized in the various multiplexer and multiplier devices illustrated without departing from the spirit and scope of the present invention.

I claim:

1. In combination: means for producing first and second di-function signals; means for multiplexing said first and second di-function signals; and means responsive to the multiplexed first and second signals for producing a signal representing the chain product thereof.

2. A device for use with a pair of di-function signal generators, said device comprising: means for alternately producing in a single di-function signal each di-function value of the pair of signals produced by the pair of generators; and means responsive to each di-function value in said single signal and the succeeding value to produce an output signal representing the di-functional product, thereof.

3. In combination: means for producing first and second di-function signals; and means for producing in an output signal the instantaneous di-function products of all simultaneously appearing instantaneous di-function values in said first and second di-function signals.

4. The combination of claim 3 wherein said first di-function signal has a predetermined timing interval, and said second di-function signal has a timing interval which is an integral multiple of said predetermined timing interval of said first di-function signal.

5. A device for multiplexing and multiplying 1st and 2nd di-function signals, each of said signals comprising a series of high and low voltage levels, each of said voltage levels appearing for an integral number of timing intervals, said device comprising: first and second electronic switching means, each of the switching means being responsive to 1st and 2nd input signals for producing high and low output voltage levels, respectively; means responsive to the high or low voltage level appearing in the 1st di-function signal during each timing interval for applying a 1st or 2nd signal, respectively, to said first switching means intermediate the timing interval; means responsive to the high or low voltage level appearing in the 2nd di-function signal during each timing interval for applying a 1st or 2nd signal, respectively, to said first switching means at the end of the timing interval; means for delaying each output voltage level produced by said first switching means one-half of a timing interval; means responsive to identical voltage levels appearing simultaneously in the output voltage level and the delayed output voltage level of said first switching means for applying a 1st signal to said second switching means; means responsive to different voltage levels appearing simultaneously in the output voltage level and the delayed output voltage level of said first switching means for applying a 2nd signal to said second switching means whereby the output voltage levels of said second switching means comprise the di-function chain product of the 1st and 2nd di-function signals.

6. A device for multiplexing first and second di-function signals, each of said signals comprising alternate high and low voltage levels, each of said voltage levels appearing for an integral number of timing intervals, said device comprising: electronic switching means responsive to first and second input signals for producing high and low voltage levels, respectively; gating means responsive to the high or low voltage level appearing during the first half of each timing interval in the first di-function signal for applying a first or second signal, respectively, to said electronic switching means; and gating means responsive to the high or low voltage level appearing during the last half of each timing interval in the second di-function signal for applying a first or second input signal, respectively, to said electronic switching means whereby the voltage levels produced by said switching means contain the voltage levels appearing in the first and second di-function signals in multiplexed form.

7. A device for multiplying a pair of di-function signals, the instantaneous di-function values of the pair of signals appearing alternately for one timing interval each in a multiplexed signal, said device comprising: means for delaying said multiplexed signal one timing interval; and means for producing a di-function signal having the instantaneous di-function products of all simultaneously appearing instantaneous di-function values in the multiplexed and delayed multiplexed signals.

8. A device for producing a di-function chain product of a pair of di-function signals, the instantaneous di-function values of the pair of signals appearing alternately for one timing interval each in a multiplexed signal, said device comprising: means for delaying the multiplexed signal one timing interval; actuable means responsive to first and second input signals for producing an output signal representing $+1$ and $-1$ di-function values, respectively; means responsive to simultaneously appearing identical di-function values in the multiplexed and delayed multiplexed signals for applying a first signal to said actuable means; and means responsive to simultaneously appearing different di-function values in the multiplexed and delayed multiplexed signals for applying a second signal to said actuable means.

9. A device for multiplying first and second di-function signals, said device comprising: actuable means responsive to first and second input signals for producing an output signal representing first and second di-function values, respectively; means for consecutively comparing each di-function value of the first signal with the simultaneous and preceding di-function values of the second signal; and means responsive to each comparison performed by the last-named means for applying first and second signals to said actuable means when the compared di-function values are identical and different, respectively.

10. A device for multiplexing first and second separate pairs of complementary di-function signals $a$, $a'$, $b$ and $b'$, each of said signals $a$ and $b$ comprising alternate high and low voltage levels, each of said levels appearing for an integral number of first timing intervals marked by alternately appearing low and high, and high and low voltage levels of complementary timing signals $c$ and $c'$, respectively, each of the voltage levels of signal $c$ and $c'$ appearing during alternate low and high voltage levels of a second timing signal $cl$, said device comprising: actuable means having first and second input conductors and responsive to input signals applied to said first and second input conductors for producing high and low output voltage levels, respectively; means responsive to high voltage levels appearing simultaneously in the $a$, $c'$ and $cl$ or the $b$, $c$ and $cl$ signals for applying an input signal to said first input conductor; and means responsive to a high voltage level appearing simultaneously in the $b'$, $c$ and $cl$ or the $a'$, $c'$ and $cl$ signals for applying an input signal to said second input conductor.

11. A device for multiplexing first and second separate pairs of complementary di-function signals $a$, $a'$, $b$ and $b'$, each of signals $a$ and $b$ comprising alternate high and low voltage levels, each of said levels appearing for an integral number of first timing intervals marked by alternately appearing low and high, and high and low voltage levels of complementary timing signals $c$ and $c'$, respectively, each of the voltage levels of signals $c$ and $c'$ appearing during alternate low and high voltage levels of a second timing signal $cl$, said device comprising: actuable means having first and second input conductors and responsive to input signals applied to said first and second input conductors for producing high and low output voltage levels, respectively; a first gating circuit comprising the mechanization of a function of the Boolean equation $(a.c'+b.c).cl$ for applying input signals to said first input conductor; and a second gating network comprising the mechanization of a function of the Boolean equation $(b'.c+a'.c').cl$ for applying input signals to said second input conductor.

12. A device for multiplying a pair of di-function signals, the di-function values and the complementary di-function values represented by said signals appearing alternately in a multiplexed signal $d$ and a complementary multiplexed signal $d'$, respectively, each of said di-function values appearing for one timing interval marked by adjacent low and high voltage levels in a timing signal $cl$, said device comprising: means for delaying signals $d$ and $d'$ one timing interval, said delayed signals being designated $e$ and $e'$, respectively; actuable means having first and second input terminals and responsive to input signals applied to said first and second input terminals for producing high and low output voltage levels, respectively; first means responsive to each simultaneous appearance of the high voltage level in signal $cl$ and the $+1$ di-function values in signals $d$ and $e$ or $d'$ and $e'$ for applying an input signal to said first input terminal; and second means responsive to each simultaneous appearance of the high voltage level in signal $cl$ and the $+1$ di-function values in signals $d$ and $e'$ or $d'$ and $e$ for applying an input signal to said second input terminal.

13. A device for multiplying a pair of di-function signals, the di-function values and the complementary di-function values represented by said signals appearing alternately in a multiplexed signal $d$ and a complementary multiplexed signal $d'$, respectively, each of said di-function values appearing for one timing interval marked by adjacent low and high voltage levels in a timing signal $cl$, said device comprising: means for delaying signals $d$ and $d'$ one timing interval, said delayed signals being designated $e$ and $e'$, respectively; actuable means having first and second input terminals and responsive to input signals applied to said first and second input terminals for producing high and low output voltage levels, respectively; a first gating network comprising the mechanization of a function of the Boolean equation $(d.e+d'.e').cl$ for applying input signals to said first input terminal; and a second gating network comprising the mechanization of a function of the Boolean equation $(d.e'+d'.e).cl$ for applying input signals to said second input terminal.

14. A device for multiplying first and second separate pairs of complementary di-function signals $g$, $g'$ and $h$, $h'$, each of signals $g$ and $h$ comprising alternate high and low voltage levels appearing for an integral number of timing intervals, each of said timing intervals being marked by an adjacent low and high voltage level of a timing signal $cl$, said device comprising: switching means having first and second input terminals and responsive to signals applied to said first and second terminals for producing high and low output voltage levels; first means responsive to high voltage levels appearing simultaneously in the $g$, $h$ and $cl$ or the $g'$, $h'$ and $cl$ signals for applying a signal to said first terminal; and second means responsive to high voltage levels appearing simultaneously in the $g$, $h'$ and $cl$ or the $g'$, $h$ and $cl$ signals for applying a signal to said second terminal.

15. A device for multiplying first and second separate pairs of complementary di-function signals $g$, $g'$ and $h$, $h'$, each of signals $g$ and $h$ comprising alternate high and low voltage levels appearing for an integral number of timing intervals, each of said timing intervals being marked by an adjacent low and high voltage level of a timing signal $cl$, said device comprising: switching means having first and second input terminals and responsive to signals applied to said first and second terminals for producing high and low output voltage levels; first gating means comprising the mechanization of a function of the Boolean equation $(g.h+g'.h').cl$ for applying signals to said first terminal; and a second gating means comprising the mechanization of a function of the Boolean equation $(g.h'+g'.h).cl$ for applying signals to said second terminal.

16. A device for multiplying a pair of di-function signals, said device comprising: a first di-function generator for producing a first di-function signal having a predetermined timing interval; a second di-function generator for producing a second di-function signal having a timing interval which is an integral multiple of the predetermined timing interval of said first di-function signal; first means responsive to said first and second di-function signals for producing during each predetermined timing interval of said first di-function signal, a first output signal when said first and second di-function signals are at the same level and a second output signal when said first and second di-function signals are at a different level.

References Cited in the file of this patent

UNITED STATES PATENTS

| | | |
|---|---|---|
| 2,485,591 | Grieg | Oct. 25, 1949 |
| 2,560,434 | Gloess | July 10, 1951 |
| 2,563,589 | Hertog | Aug. 7, 1951 |
| 2,570,220 | Earp | Oct. 9, 1951 |
| 2,590,950 | Eckert | Apr. 1, 1952 |
| 2,596,199 | Bennett | May 13, 1952 |
| 2,600,744 | Eckert | June 17, 1952 |
| 2,615,127 | Edwards | Oct. 21, 1952 |
| 2,643,820 | Williams et al. | June 30, 1953 |
| 2,644,887 | Wolfe | July 7, 1953 |
| 2,672,517 | Boughtwood | Mar. 16, 1954 |

OTHER REFERENCES

Auerbach et al.: "The Binac," Proc. IRE, January 1952, page 19 relied on.

Progress Report (2) on the EDVAC, Moore School, Univ. of Pa. Declassified Feb. 13, 1947 (pages 1–2–13 to 1–2–17; dwg. sht. PY–O–107).